(12) United States Patent
Yuan

(10) Patent No.: US 8,930,055 B2
(45) Date of Patent: Jan. 6, 2015

(54) DUAL-ROTOR MOTOR FOR ELECTRIC VEHICLES WITH A CONTINUOUSLY VARIABLE TRANSMISSSION SYSTEM WITH PLANET GEAR AND CONTROL METHOD THEREOF

(75) Inventor: Yiqing Yuan, Shanghai (CN)

(73) Assignee: Shanghai Zhongke Shenjiang Electric Vehicle Co., Ltd., Shanghai (CN)

( * ) Notice: Subject to any disclaimer, the term of this patent is extended or adjusted under 35 U.S.C. 154(b) by 0 days.

(21) Appl. No.: 13/823,592

(22) PCT Filed: Jun. 27, 2011

(86) PCT No.: PCT/CN2011/076434
§ 371 (c)(1),
(2), (4) Date: Mar. 14, 2013

(87) PCT Pub. No.: WO2012/034439
PCT Pub. Date: Mar. 22, 2012

(65) Prior Publication Data
US 2013/0190961 A1    Jul. 25, 2013

(30) Foreign Application Priority Data

Sep. 16, 2010   (CN) .......................... 2010 1 0283847

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *H02K 16/02* | (2006.01) |
| *H02K 51/00* | (2006.01) |
| *B60L 15/20* | (2006.01) |
| *F16H 3/44* | (2006.01) |
| *H02K 7/116* | (2006.01) |

(52) U.S. Cl.
CPC ................ *H02K 16/02* (2013.01); *H02K 51/00* (2013.01); *B60L 15/20* (2013.01); *F16H 3/44* (2013.01); *H02K 7/116* (2013.01); *Y02T 10/641* (2013.01); *Y10S 475/904* (2013.01)
USPC ............. 701/22; 475/904; 180/65.1

(58) Field of Classification Search
None
See application file for complete search history.

(56) References Cited

U.S. PATENT DOCUMENTS

| | | | |
|---|---|---|---|
| 6,726,590 B2 * | 4/2004 | Henzler et al. ................ | 475/216 |
| 7,696,654 B2 * | 4/2010 | Sugita et al. ............... | 310/12.15 |

(Continued)

FOREIGN PATENT DOCUMENTS

| | | |
|---|---|---|
| CN | 1753283 | 3/2006 |
| CN | 101131199 | 2/2008 |
| CN | 101192783 | 6/2008 |
| CN | 101951092 | 1/2011 |
| JP | 2007176294 | 7/2007 |

*Primary Examiner* — John R Olszewski
*Assistant Examiner* — Tommy Worden
(74) *Attorney, Agent, or Firm* — Blue Filament Law PLLC; Avery N. Goldstein

(57) ABSTRACT

The present invention relates to a dual-rotor motor for electric vehicle, wherein an output shaft is at least partly located in a housing and arranged rotatably relative to the housing, a stator is sleeved around the output shaft, an outer three-phase winding is arranged outside the stator, an outer rotor is sleeved around the outer three-phase winding and arranged rotatably relative to the stator, an inner three-phase winding is arranged inside the stator, an inner rotor is inserted in the inner three-phase winding around the output shaft and arranged rotatably relative to the stator, and a continuously variable transmission system with planet gear and dual-rotor motor for electric vehicle and a control method thereof are provided, the dual-rotor motor for electric vehicle of the present invention is designed skillfully and unique in structure, by cooperating with the planet gear, it can sufficiently make use of the wide speed adjustable range of the motor to regulate speeds, compared with an automatic stepped or continuous variable transmission cooperating with a traditional internal combustion engine, the structure of the transmission system is simpler, and has advantages of stepless speed change and high transmission efficiency, and ultimately improves the vehicle performance, therefore the present invention is suitable for large-scale popularization.

12 Claims, 7 Drawing Sheets

(56) References Cited

U.S. PATENT DOCUMENTS

| | | | |
|---|---|---|---|
| 2001/0051557 A1* | 12/2001 | Kawada et al. | 475/248 |
| 2002/0148310 A1* | 10/2002 | Uchino | 74/335 |
| 2003/0102727 A1* | 6/2003 | Sakamoto | 310/49 R |
| 2007/0187159 A1* | 8/2007 | Lee et al. | 180/65.2 |
| 2009/0009011 A1* | 1/2009 | Edelson et al. | 310/48 |
| 2009/0071784 A1* | 3/2009 | Combs et al. | 192/3.21 |
| 2010/0123426 A1* | 5/2010 | Nashiki et al. | 318/701 |

* cited by examiner (Section D–D)

(Section B–B)

DUAL-ROTOR MOTOR FOR ELECTRIC VEHICLES WITH A CONTINUOUSLY VARIABLE TRANSMISSSION SYSTEM WITH PLANET GEAR AND CONTROL METHOD THEREOF

FIELD OF TECHNOLOGY

The present invention relates to the technical field of drive systems for electric vehicles, especially to the technical field of motor controllers for electric drive systems of electric vehicles, and in particular to a dual-rotor motor for an electric vehicle, with a related continuously variable transmission system with a planet gear and a control method thereof.

DESCRIPTION OF RELATED ARTS

The power transmission systems of electric vehicles (including pure electric vehicles and hybrid electric vehicles) have five common technical solutions: (1) a single motor, a reducer, a differential; (2) a single motor, a variable transmission, a differential, the variable transmission can be of 2-speed to 4-speed in general; (3) 2 or 4 in-wheel motors, no reducer; (4) 2 or 4 in-wheel motors with a planet gear or a reducer; (5) a stator contra-rotating electric motor in which the stator and the rotor can rotate in the opposite directions.

With the in-wheel motors, through the drive systems such as the variable transmission, the reducer, the differential, the drive shaft, the coupling can be saved, to simplify the structure of the power system, to increase the efficiency of the system, but they are yet not used widely in electric vehicles for the problems of complicated controlling and durability are difficult to settle.

The power transmission solution with the single motor, the reducer and the differential is prevalent in the popular small and micro pure electric vehicles. The advantages are that there is no clutch, it is easy to achieve the feedback of the regenerative braking energy; the structure is simple, and improves the reliability and the efficiency. In addition, there is no need to change gear, since the smoothness of the running is good. The disadvantages are that the torque is relatively high and the speed adjustable range is wide when the drive motor runs at a low speed. Therefore, this solution is generally not suitable for the situation where the starting torque and the maximum speed are great, such as for relatively large vehicles such as for example minibuses and buses running on the highways.

The power transmission solution with the single motor, the variable transmission and the differential can decrease the requirements to the peak torque, the peak rotating speed and the speed adjustable range of the drive motor, so as to reduce the cost of the motor, while it is relatively easy to design for the commonly used vehicle speeds within the optimal efficiency area of the motor, so as to improve the efficiency of the system. The disadvantages are that the drive mechanism is more complicated, the rotatable members are increased, and the efficiency and the reliability of the drive mechanism itself is slightly lower. In addition, if the power transmission continues to use the original vehicle variable transmission, it is often provided with a clutch, but the clutch as the function of a starting device appears to be redundant, and in general the damping mechanism on the clutch plate is not needed for electric vehicles. Moreover, when the common metal belt continuously automatic variable transmission is used, the functions appear to be redundant, for the speed adjusting capability of the motor itself is wasted, and the complexity of the system is increased unnecessarily. If a stepped automatic variable transmission is used, the unavoidable imperfection experienced during gear shifting is added to the smoothing power of the motor itself.

In summary, the power transmission system of electric vehicles needs a technical solution different from that of traditional fuel vehicles. The power transmission system of electric vehicles main features are that: (1) It can sufficiently make use of the wide speed adjustable range of the motor to regulate speeds; (2) Compared with an automatic stepped or continuous variable transmission cooperating with a traditional internal combustion engine, the structure of the transmission system is simpler, (3) It has advantages of stepless speed change and high transmission efficiency.

Therefore, it is desirable to provide a power transmission system for electric vehicles, which can sufficiently make use of the wide speed adjustable range of the motor to regulate speeds, compared with an automatic stepped or continuous variable transmission cooperating with a traditional internal combustion engine. The structure of the transmission system is simpler, and it has advantages of stepless speed change and high transmission efficiency.

SUMMARY OF THE INVENTION

Aspects of the present invention generally pertain to a dual-rotor motor for electric vehicles, a related continuously variable transmission system with a planet gear and a control method thereof, the dual-rotor motor for electric vehicles is designed skillfully and is unique in structure, by cooperating with the planet gear, it can sufficiently make use of the wide speed adjustable range of the motor to regulate speeds, compared with an automatic stepped or continuous variable transmission cooperating with a traditional internal combustion engine. The structure of the transmission system is simpler, and has advantages of stepless speed change and high transmission efficiency, and ultimately improves the vehicle performance, therefore the present invention is suitable for large-scale popularization.

In order to realize the above aims, in a first aspect of the present invention, a dual-rotor motor for electric vehicle is provided, and comprises a housing, an output shaft, and an outer rotor and a stator located inside the housing, the output shaft is at least partly located in the housing and arranged rotatably relative to the housing, the stator is sleeved around the output shaft, an outer three-phase winding is arranged outside the stator, the outer rotor is sleeved around the outer three-phase winding and arranged rotatably relative to the stator, characterized in that, the dual-rotor motor for electric vehicle further comprises an inner rotor, an inner three-phase winding is arranged inside the stator, the inner rotor is inserted in the inner three-phase winding around the output shaft and arranged rotatably relative to the stator, thus the inner three-phase winding and the inner rotor constitute an inner motor subsystem, the outer three-phase winding and the outer rotor constitute an outer motor subsystem.

In a further aspect, each of the outer rotor and the inner rotor is any one of a permanent magnet and an excitation winding.

In a second aspect of the present invention, a continuously variable transmission system with a planet gear and a dual-rotor motor for electric vehicles is provided and comprises a planet gear and the dual-rotor motor for an electric vehicle mentioned above, where the outer rotor is connected with any one of the ring gear, the planet carrier and the sun gear of the planet gear, the inner rotor is connected with another one of the ring gear, the planet carrier and the sun gear, the output shaft is connected with the third one of the ring gear, the planet carrier and the sun gear.

In a further aspect, the outer rotor is connected with the ring gear, the inner rotor is connected with the sun gear, and the output shaft is connected with the planet carrier.

In a further aspect, the outer rotor is connected with the ring gear, the inner rotor is connected with the planet carrier, and the output shaft is connected with the sun gear.

In a further aspect, the outer rotor is connected with the planet carrier, the inner rotor is connected with the ring gear, and the output shaft is connected with the sun gear.

In a further aspect, the continuously variable transmission system with planet gear and dual-rotor motor for electric vehicles further comprises a differential, and the output shaft is connected with the differential housing of the differential.

In yet another aspect, the continuously variable transmission system with planet gear and dual-rotor motor for electric vehicles further comprises a pair of main reduction gears, the pair of main reduction gears are located between the planet gear and the differential housing and connected with the planet gear and the differential housing respectively.

In yet another aspect, the continuously variable transmission system with planet gear and dual-rotor motor for electric vehicles further comprises a semiaxle, where the semiaxle is connected with the differential, and the output shaft is a hollow shaft through which the semiaxle passes.

In a third aspect of the present invention, an optimal energy economical control method of the continuously variable transmission system with a planet gear and a dual-rotor motor for electric vehicles mentioned above is provided and comprises, determining a motor running mode to be a driving mode, or a braking energy feedback mode with the vehicle controller according to a running state of the vehicle, a battery state of charge (SOC), states and time rates of changes of the accelerator pedal and the brake pedal, and then determining a working torque $T_3$ of the dual-rotor motor for electric vehicle; then sending the motor running mode and the torque instruction to a controller for the inner motor subsystem and a controller for the outer motor subsystem, then with the controller for the inner motor subsystem and the controller for the outer motor subsystem, determining torques $T_1$, $T_2$ that the inner rotor and the outer rotor should provide according to the topological structure of the continuously variable transmission system with the planet gear and the dual-rotor motor for an electric vehicle and the tooth numbers of the ring gear and the sun gear, calculating an output rotating speed $\omega_3$ according to the vehicle speed and the dynamic radius of the wheels, then in real time calculating optimal working rotating speeds of the inner rotor and the outer rotor at this time according to the efficiency curves of the inner motor subsystem and the outer motor subsystem, wherein:

$$\max[\eta_{sys}] = \max[\eta_{sys1}(T_1,\omega_1) \cdot \eta_{sys2}(T_2,\omega_2)], \tag{2}$$

$$T_1 = f(T_3, N_a, N_s), \tag{3}$$

$$T_2 = f(T_3, N_a, N_s), \tag{4}$$

$$\omega_3 = f(\omega_1, \omega_2, N_a, N_s) \tag{5}$$

wherein, $\eta_{sys}$ is a total system efficiency, $\eta_{sys1}$ is a comprehensive system efficiency of the controller for the inner motor subsystem, the inner three-phase winding and the inner rotor; $\eta_{sys2}$ is a comprehensive system efficiency of the controller for the outer motor subsystem, the outer three-phase winding and the outer rotor; $T_1$ is the target torque that the inner rotor should provide; $T_2$ is the target torque that the outer rotor should provide; $\omega_1$ is the optimal working rotating speed of the inner rotor at this time; $\omega_2$ is the optimal working rotating speed of the outer rotor at this time.

In a fourth aspect of the present invention, an optimal energy economical control method of the continuously variable transmission system with the planet gear and the dual-rotor motor for electric vehicles mentioned above is provided and comprises, determining a motor running mode to be a driving mode, or a braking energy feedback mode with the vehicle controller according to traveling running state of the vehicle, a battery state of charge (SOC), states and time rates of changes of the accelerator pedal and the brake pedal, and then determining a working torque $T_3$ of the dual-rotor motor for electric vehicle; then sending the motor running mode and the torque instruction to a motor controller, then with the motor controller, determining torques $T_1$, $T_2$ that the inner rotor and the outer rotor should provide according to the topological structure of the continuously variable transmission system with the planet gear and the dual-rotor motor for the electric vehicle and the tooth numbers of the ring gear and the sun gear, calculating an output rotating speed $\omega_3$ according to the vehicle speed and the dynamic radius of the wheels, then in real time calculating optimal working rotating speeds of the inner rotor and the outer rotor at this time according to the efficiency curves of the inner motor subsystem and the outer motor subsystem, wherein:

$$\max[\eta_{sys}] = \max\left[\frac{\eta_{m1}(T_1,\omega_1)T_1\omega_1 + \eta_{m2}(T_2,\omega_2)T_2\omega_2}{T_1\omega_1 + T_2\omega_2}\eta_c(T_1,\omega_1,T_2,\omega_2)\right], \tag{7}$$

$$T_1 = f(T_3, N_a, N_s), \tag{3}$$

$$T_2 = f(T_3, N_a, N_s), \tag{4}$$

$$\omega_3 = f(\omega_1, \omega_2, N_a, N_s), \tag{5}$$

wherein, $\eta_{sys}$ is a total system efficiency, $\eta_{m1}(T_1,\omega_1)$ is a system efficiency of the inner motor subsystem; $\eta_{m2}(T_2,\omega_2)$ is a system efficiency of the outer motor subsystem; $\eta_c(T_1,\omega_1,T_2,\omega_2)$ is an efficiency of the motor controller; $T_1$ is the target torque that the inner rotor should provide; $T_2$ is the target torque that the outer rotor should provide; $\omega_1$ is the optimal working rotating speed of the inner rotor at this time; $\omega_2$ is the optimal working rotating speed of the outer rotor at this time.

In a further aspect, the control method of the continuously variable transmission system with planet gear and dual-rotor motor for electric vehicle mentioned above is characterized in that, it uses a current and rotating speed dual closed-loop control method, and determines excitation current components $i_{d1}$, $i_{d2}$ and torque current components $i_{q1}$, $i_{q2}$ of the inner three-phase winding and the outer three-phase winding according to the vector control algorithm, once the target torques and the working rotating speeds of the inner rotor and the outer rotor are determined, and then determines three-phase alternating currents $i_{A1}$, $i_{B1}$, $i_{C1}$ and $i_{A2}$, $i_{B2}$, $i_{C2}$ input into the inner three-phase winding and the outer three-phase winding according to the following Clarke inverse transform equation (8) and the Park inverse transform equation (9), so as to make the inner rotor and the outer rotor run under the target torques and at the working rotating speeds, wherein:

$$\begin{bmatrix} i_{A1} \\ i_{B1} \\ i_{C1} \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta_1 & -\sin\theta_1 \\ \sin\theta_1 & \cos\theta_1 \end{bmatrix} \begin{bmatrix} i_{d1} \\ i_{q1} \end{bmatrix}, \quad (8)$$

$$\begin{bmatrix} i_{A2} \\ i_{B2} \\ i_{C2} \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta_2 & -\sin\theta_2 \\ \sin\theta_2 & \cos\theta_2 \end{bmatrix} \begin{bmatrix} i_{d2} \\ i_{q2} \end{bmatrix}, \quad (9)$$

Wherein $\theta_1$, $\theta_2$ are the angles between the α axis (two-phase stationary coordinate system α-β), and the d axis (two-phase rotating coordinate system d-q), respectively.

The advantages of the present invention are as follows:

1. The continuously variable transmission system with a planet gear and a dual-rotor motor for electric vehicles of the present invention comprises a planet gear and a dual-rotor motor for an electric vehicle, the outer rotor is connected with any one of the ring gear, the planet carrier and the sun gear of the planet gear, the inner rotor is connected with another one of the ring gear, the planet carrier and the sun gear, the output shaft is connected with the third one of the ring gear, the planet carrier and the sun gear, thus the necessary function of stepless speed change is achieved, which greatly improves the lack of smoothness caused by the torque fluctuation when the stepped variable transmission shifts and the comfort of the occupants, therefore the present invention is designed skillfully and is unique in structure, compared with an automatic stepped or continuous variable transmission cooperating with a traditional internal combustion engine. The structure of the transmission system is simpler, and ultimately improves the vehicle performance, therefore the present invention is suitable for large-scale popularization.

2. The continuously variable transmission system with a planet gear and a dual-rotor motor for electric vehicles of the present invention can improve the efficiency of an electric drive transmission system, with the inner and outer motor subsystems running under integrated optimal operating conditions, and contributes to improve the vehicle economy, power, and even to increase the driving range, the acceleration performance and the climbing performance of electric vehicles, therefore the present invention is suitable for large-scale popularization.

3. The continuously variable transmission system with a planet gear and a dual-rotor motor for electric vehicles of the present invention can relatively easily solve some technical problems of traditional electric drive systems such as single motors and in-wheel motors. For example, the slope maintaining condition, i.e., the condition of releasing the brake pedal and pressing down the accelerator pedal to maintain a stationary position on the slope. Under this condition, generally the motor needs to output a stall torque to balance the torque caused by the downhill force. In general the stall time of the motor is very limited, only tens of seconds. Subsequently, the motor becomes overheated, and generally the driver is prompted by the vehicle controller to press down the brake pedal to prevent the motor from being damaged by overheating. The present invention allows the motor to output the necessary torque, at the same time the rotating speed output by the planetary gear system to be zero and the rotating speeds of the two rotors to not be zero, to maintain position on the slope without the motor entering into the stall condition, greatly extending the slope maintaining time.

4. The continuously variable transmission system with a planet gear and a dual-rotor motor for electric vehicles of the present invention improves the performance and the efficiency of the system, and at the same time also considers the simplicity of the system by using only one planet gear mechanism. Thus, the number of parts of the system is small, the cost is relatively low, and the reliability of the system is improved greatly; if a motor controller is used to control the inner and outer motor subsystems, the system can be further simplified, and the cost is further reduced, and therefore the present invention is suitable for large-scale popularization.

5. The continuously variable transmission system with a planet gear and a dual-rotor motor for electric vehicles of the present invention can also achieve some functions that the traditional electric drive system does not have, such as overdrive and forward reversing transmission. During overdrive, the rotating speed output by the system is higher than the rotating speed of each rotor, which is a very valuable feature, because this can allow that the maximum rotating speed of the motor is not too high to obtain a very high vehicle speed, and the technical requirements to the motor can be reduced, which can help to improve the reliability and the service life of the motor. During forward reversing transmission, the inner and outer rotors of the motor both rotate in the forward direction, while the output shaft can rotate in the backward direction, to achieve the reversing condition. This means that using this method can use the motor-driven vehicles with two-quadrant operation in order to achieve all vehicle condition requirements.

BRIEF DESCRIPTION OF THE DRAWINGS

FIG. 2b is a sectional view of the position D-D in FIG. 2a;

FIG. 2c is a sectional view of the position B-B in FIG. 2a;

DETAILED DESCRIPTION OF THE PREFERRED EMBODIMENT

In order to understand the technical content of the present invention clearly, the present invention is further exemplified by reference to the following examples. It is only intended to make the contents of the present invention to be better understood, and not to limit the protection scope of the present invention.

Figure 1:
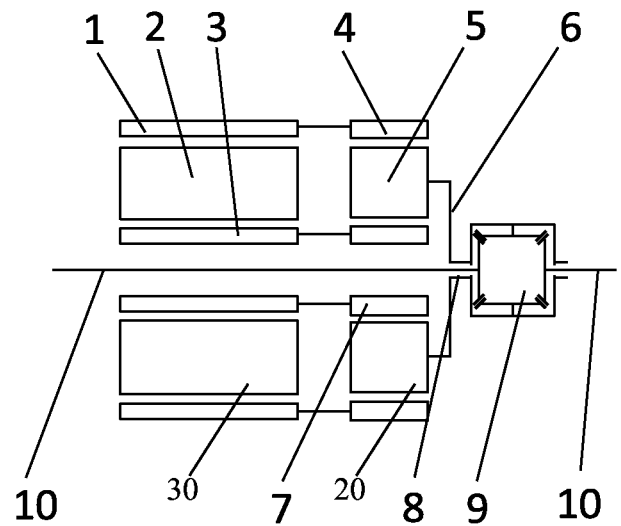
FIG. 1 is a schematic structural view of the continuously variable transmission system with a planet gear and a dual-rotor motor for electric vehicles of the present invention.
Figure 2A:
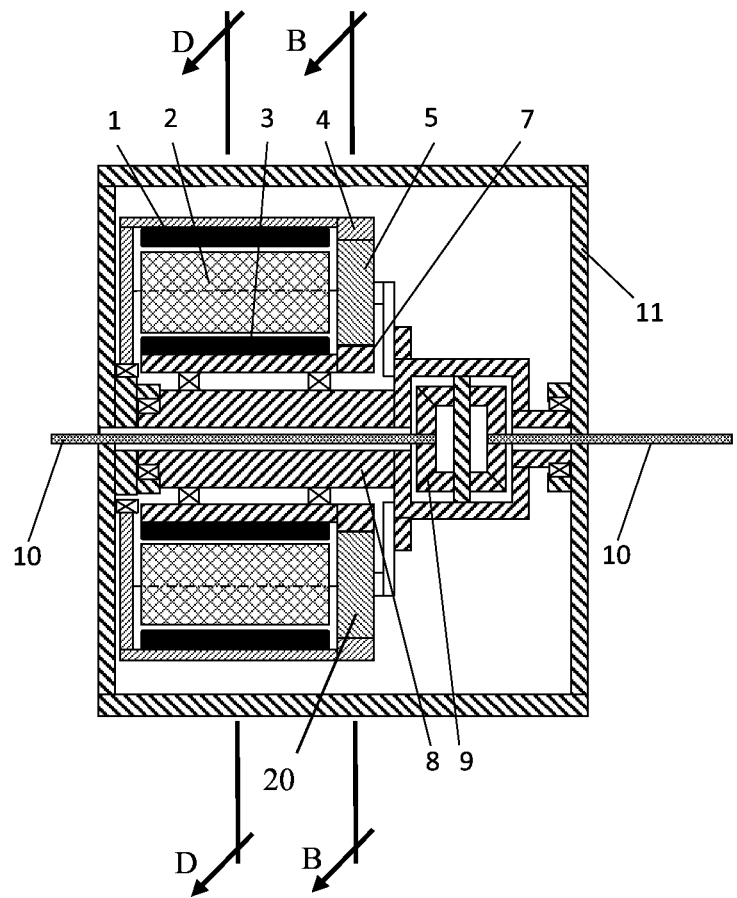
FIG. 2a is a schematic sectional view of one embodiment of the continuously variable transmission system with the planet gear and the dual-rotor motor for electric vehicles vehicle of the present invention.
Figure 2B:
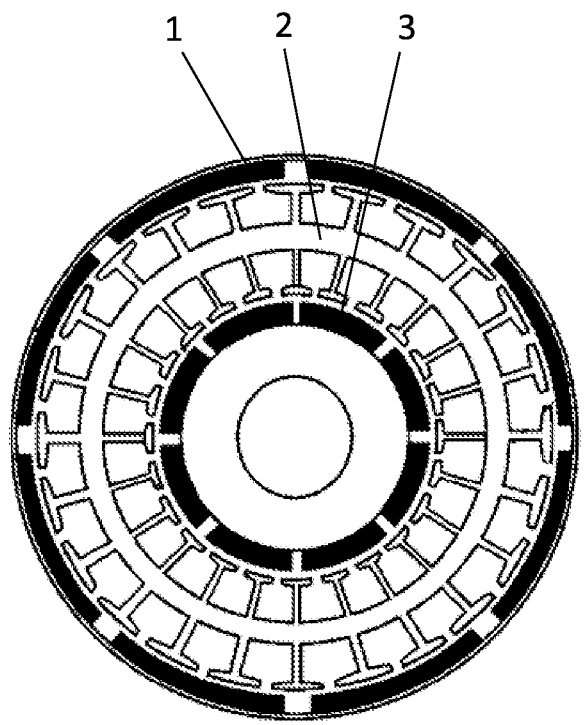
Figure 2C:
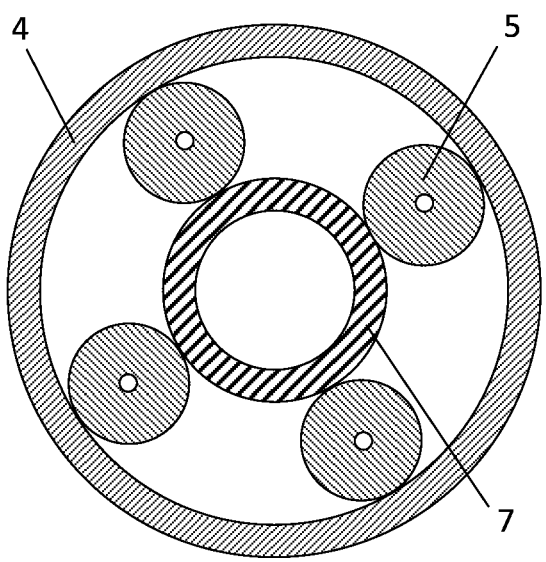

Please refer to FIGS. 1-2c, the continuously variable transmission system with a planet gear and a dual-rotor motor for electric vehicles of the present invention comprises a planet gear 20 and a dual-rotor motor for electric vehicle 30.

The dual-rotor motor for electric vehicle 30 comprises a housing 11, an output shaft 8, and an outer rotor 1, an inner rotor 3 and a stator 2 located inside the housing 11, the output shaft 8 is at least partly located in the housing 11 and arranged rotatably relative to the housing 11, the stator 2 is sleeved around the output shaft 8, an outer three-phase winding (not shown) is arranged outside the stator 2, the outer rotor 1 is sleeved around the outer three-phase winding and arranged rotatably relative to the stator 2, an inner three-phase winding (not shown) is arranged inside the stator 2, the inner rotor 3 is inserted in the inner three-phase winding around the output shaft 8 and arranged rotatably relative to the stator 2, thus the inner three-phase winding and the inner rotor 3 constitute an inner motor subsystem, the outer three-phase winding and the outer rotor 1 constitute an outer motor subsystem.

That is to say, the inner rotor 3 and the outer rotor 1 share the stator 2, which is located between the inner rotor 3 and the outer rotor 1, a three-phase winding is present at each of the inner and outer sides of the stator 2, i.e. the inner three-phase winding and the outer three-phase winding, and generates a rotating magnetic field to each of the inner rotor 3 and the outer rotor 1. The inner rotor 3 and the outer rotor 1 can be either permanent magnets, or excitation windings, or a combination of a permanent magnet and an excitation winding. Please refer to FIG. 2a and to FIG. 2b, in the embodiment of the present invention, the inner rotor 3 and the outer rotor 1 both are permanent magnets.

The planet carrier 6 of the planet gear 20 is connected with the ring gear 4 and the sun gear 7 respectively through the planet wheel 5 (see FIG. 2c), the outer rotor 1 is connected with any one of the ring gear 4, the planet carrier 6 and the sun gear 7 of the planet gear 20, the inner rotor 3 is connected with another one of the ring gear 4, the planet carrier 6 and the sun gear 7, the output shaft 8 is connected with the third one of the ring gear 4, the planet carrier 6 and the sun gear 7.

That is to say, one of the three components the outer rotor 1, the inner rotor 3 and the output shaft 8 and one of the three components the ring gear 4, the planet carrier 6 and the sun gear 7 are connected to transmit the torque with each other, and the connection here can be rigid or through axial tooth spaces only transmitting the torque, therefore, there are six kinds of connections in total:

Please refer to FIGS. 2a-2c, in the embodiment of the present invention, the outer rotor 1 is connected with the ring gear 4, the inner rotor 3 is connected with the sun gear 7, the output shaft 8 is connected with the planet carrier 6. Alternatively, the outer rotor 1 is connected with the planet carrier 6, the inner rotor 3 is connected with the sun gear 7, the output shaft 8 is connected with the ring gear 4. Alternatively, the outer rotor 1 is connected with the ring gear 4, the inner rotor 3 is connected with the planet carrier 6, the output shaft 8 is connected with the sun gear 7. Alternatively, the outer rotor 1 is connected with the sun gear 7, the inner rotor 3 is connected with the planet carrier 6, the output shaft 8 is connected with the ring gear 4. Alternatively, the outer rotor 1 is connected with the planet carrier 6, the inner rotor 3 is connected with the ring gear 4, the output shaft 8 is connected with the sun gear 7. Alternatively, the outer rotor 1 is connected with the sun gear 7, the inner rotor 3 is connected with the ring gear 4, the output shaft 8 is connected with the planet carrier 6.

Please refer to FIG. 2a, in the embodiment of the present invention, the continuously variable transmission system with planet gear and dual-rotor motor for electric vehicle further comprises a differential 9, the output shaft 8 is connected with the differential housing (not shown) of the differential 9. That is to say, the output shaft 8 is connected with the planet carrier 6, to transmit the torque to the differential 9, and then to the wheels at both sides through the semiaxles 10 connected with the differential 9, this solution is mainly used for the front-wheel drive vehicles, wherein the output shaft 8 may be a hollow shaft, through which one of the semiaxles 10 can pass when it is positioned laterally in the front cabin, to transmit the torque to the wheels, the output shaft 8 can also be a solid shaft, which can be connected with the front axle or the rear axle when it is positioned longitudinally, to transmit the torque to the wheels; for rear-wheel drive vehicles, the output shaft 8 transmits the torque to the rear axle differential (not shown in figures) through the drive shaft, the coupling and so on.

More preferably, the continuously variable transmission system with the planet gear and the dual-rotor motor for electric vehicles further comprises a pair of main reduction gears (not shown), the pair of main reduction gears are located between the planet gear 20 and the differential housing and are connected with the planet gear 20 and the differential housing respectively, so as to improve the overall gear ratio.

In this example, a motor controller is used to control the continuously variable transmission system with planet gear and dual-rotor motor for the electric vehicle.

With the embodiment shown in FIGS. 2a-2c, after the torques $T_1$, $T_2$ generated in the inner rotor 3 and the outer rotor 1 are transmitted to the sun wheel 7 and the ring gear 4 of the planet gear 20, respectively, the torque $T_3$ output from the planet carrier 6 is the sum of their torques, i.e.

$$T_3 = T_1 + T_2, \tag{10}$$

Wherein, $$T_s = T_1 = \frac{N_s}{N_a + N_s} T_3, \tag{11}$$

$$T_a = T_2 = \frac{N_a}{N_a + N_s} T_3, \tag{12}$$

Here, A represents the ring gear 4, C represents the planet carrier 6, S represents the sun gear 7, $T_s$, $T_a$ are the tooth numbers of the sun gear 7 and the ring gear 4, respectively, $N_s$, $N_a$ are the tooth numbers of the sun gear 7 and the ring gear 4, respectively. It can be seen that generally, the directions of the torques $T_s$, $T_a$ acting on the sun gear 7 and the ring gear 4 are the same, otherwise one of the rotors works not in the motor mode, but in the generator mode. In an actual vehicle, the torque instruction $T_3$ is determined by the vehicle controller, the torques $T_1$, $T_2$ generated in the inner rotor 3 and the outer rotor 1 of the motor can be calculated according to the equations (11) and (12). The output rotating speed $\omega_c$ of the planet carrier 6 is determined by the following equations:

$$\omega_c = \frac{N_s}{N_a + N_s} \omega_s + \frac{N_a}{N_a + N_s} \omega_a, \tag{13}$$

Wherein $\omega_s$, $\omega_a$ are the rotating speeds of the sun gear 7 and the ring gear 4. It can be seen that, when $$\omega_a = -\frac{N_s}{N_a}\omega_s, \tag{14}$$

$$\omega_c = 0.$$

Figure 3A:
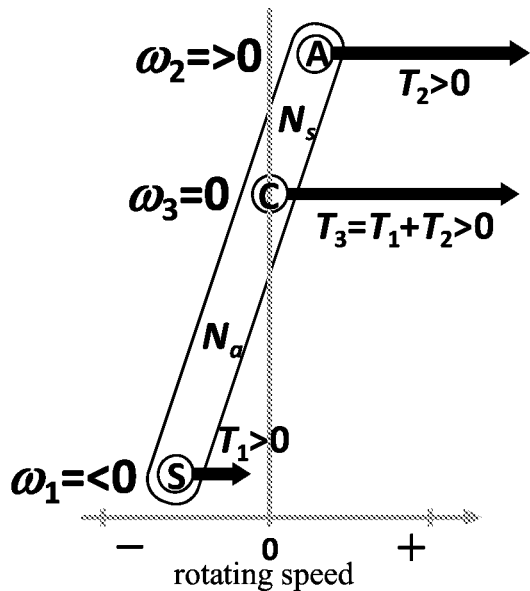
FIGS. 3a-3e are schematic views of torques and rotating speed states of the embodiment shown in FIG. 2a under several typical conditions.

Therefore, the system can achieve the long time slope maintaining function. This function requires that the output rotating speed is zero, i.e., $\omega_c=0$, while the output torque is not zero. When the states of the speeds and the torques of the continuously variable transmission system with planet gear and dual-rotor motor for electric vehicle are as shown in FIG. 3a, the directions of the rotating speeds of the inner rotor 3 and the outer rotor 1 are opposite, while the input and output torques both are in the forward direction. This forward direction output torque acts on the wheels through the differential 9 to balance the torque caused by the downhill force on the wheels. This is one of the main features of the present invention that is superior to the general single-motor or the in-wheel motor drive system.

Figure 3B:
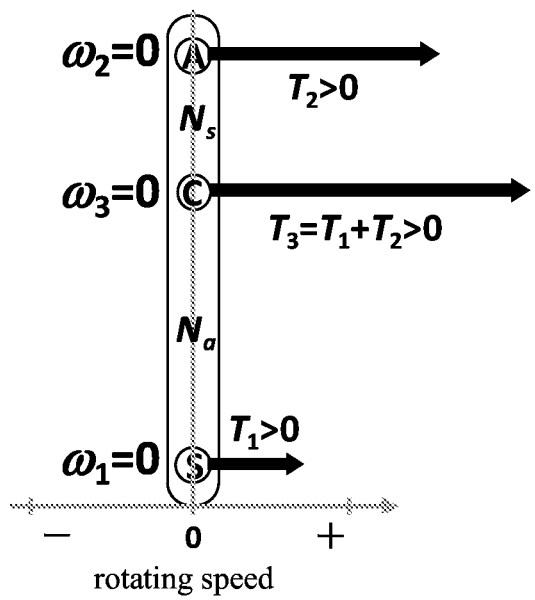

When the vehicle starts on the flat ground, the typical states of the speeds and the torques of the continuously variable transmission system with the planet gear and the dual-rotor motor for electric vehicles are as shown in FIG. 3b. The initial rotating speeds of the inner rotor 3 and the outer rotor 1 both are zero, when the torques that the inner rotor 3 and the outer rotor 1 transmit to the planet gear 20 both are in the forward direction, the maximum acceleration can be obtained.

Figure 3C:
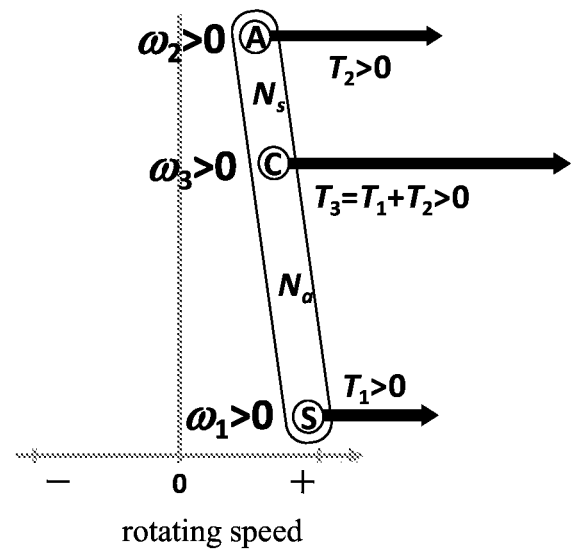

When the vehicle accelerates, the typical states of the speeds and the torques of the continuously variable transmission system with the planet gear and the dual-rotor motor for electric vehicles are as shown in FIG. 3c, the rotating speeds of the inner rotor 3 and the outer rotor 1 both are in the forward direction, the torques that the inner rotor 3 and the outer rotor 1 transmit to the planet gear 20 both are also in the forward direction.

Figure 3D:
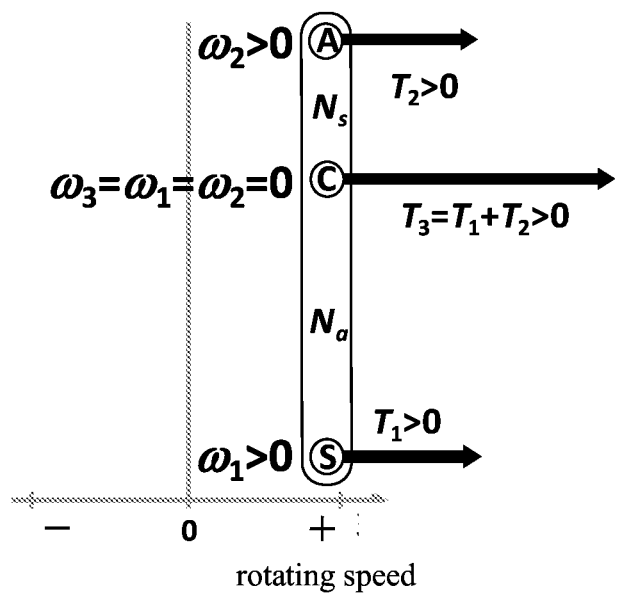

The planet gear 20 can obtain the so-called direct drive similar to the conventional automatic transmission (AT), and at this time the typical states of the speeds and the torques of the continuously variable transmission system with the planet gear and the dual-rotor motor for electric vehicles are as shown in FIG. 3d, wherein all parts of the planet gear 20 rotate at the same angular velocity, i.e. $\omega_s=\omega_a=\omega_c$, moving like a rigid body. It should be noted that, at this time the torques of the inner rotor 3 and the outer rotor 1 are not required necessarily to be equal.

Figure 3E:
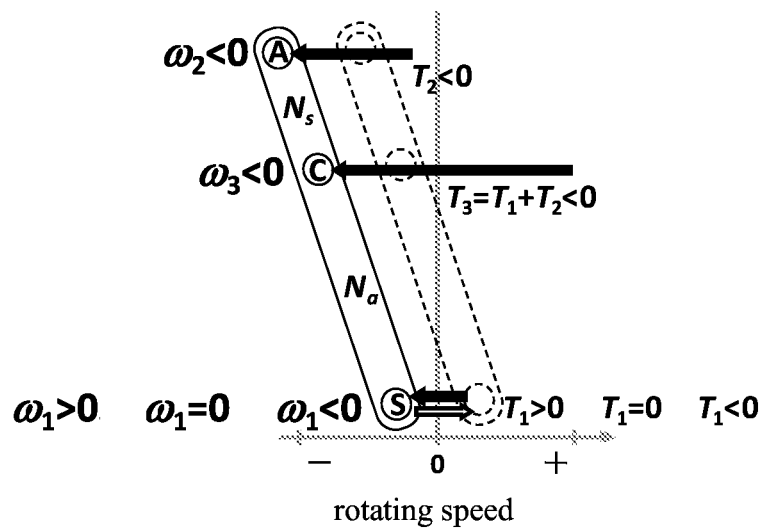

When the vehicle reverses, the typical states of the speeds and the torques of the continuously variable transmission system with the planet gear and the dual-rotor motor for electric vehicles are as shown in FIG. 3e, and at this time at least one of the inner rotor 3 and the outer rotor 1 must rotate in the backward direction. The solid line portion at the left side is the state of the outer rotor 1 rotating in the backward direction, and at this time the inner rotor 3 may rotate in the forward direction, does not rotate, or rotates in the backward direction. The dashed line part at the right side is the state of the inner rotor 3 rotating in the backward direction, and at this time the outer rotor 1 may rotate in the forward direction, does not rotate, or rotates in the backward direction. In any case, the directions of the torques of the inner rotor 3 and the outer rotor 1 both should be in the backward direction.

Figure 4A:
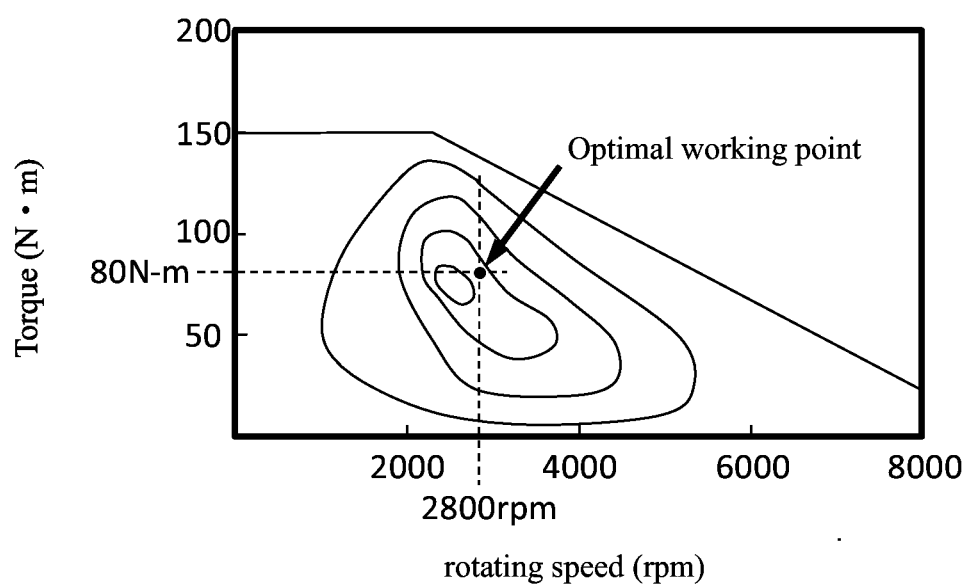
FIG. 4a and FIG. 4b are schematic views of the methods for determining the optimal working points of the inner motor subsystem and the outer motor subsystem of the embodiment shown in FIG. 2 under the optimal power control strategy.
Figure 4B:
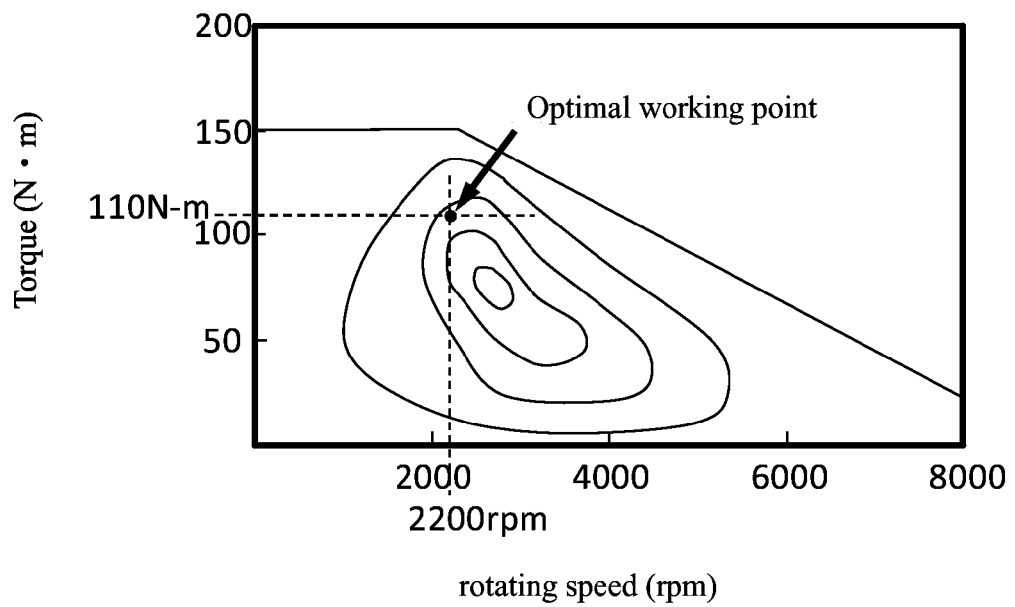

At any time, the system can be controlled according to the optimal energy economical control strategy, as shown in the example of FIGS. 4a and 4b. The vehicle controller determines that the driving intention is to accelerate according to the running state of the vehicle, the positions and the movements of the accelerator pedal and the brake pedal, the torque demand $T_3$ is 190 N-m, the torques of the sun gear 7 and the ring gear 4 can be determined according to the topological structure of the continuously variable transmission system with the planet gear and the dual-rotor motor for electric vehicles and the tooth numbers of the ring gear and the sun gear, i.e., the equations (16) and (17) in the present example, while the output rotating speed $\omega_3$ can be determined according to the vehicle speed and the dynamic radius of the wheels. According to the efficiency curves $\eta_1(T_1, \omega_1)$ and $\eta_2(T_2, \omega_2)$ of the corresponding motor subsystems, and known values $T_3$, $\omega_3$ to solve the objective function (15) to make it meet the constraint conditions (16) to (18), the rotating speeds $\omega_1$, $\omega_2$ of the inner rotor 3 and the outer rotor 1 can be calculated. In this example, $T_1$, $T_2$ are 80 N-m and 110 N-m respectively, $\omega_1$, $\omega_2$ are 2800 rpm and 2200 rpm respectively, which determine the optimal working points at this moment.

$$\max[\eta_{sys}] = \max[\eta_{sys1}(T_1, \omega_1) \cdot \eta_{sys2}(T_2, \omega_2)], \tag{15}$$

$$T_1 = \frac{N_s}{N_a + N_s} T_3, \tag{16}$$

$$T_2 = \frac{N_a}{N_a + N_s} T_3, \tag{17}$$

$$\omega_3 = \frac{N_s}{N_a + N_s} \omega_1 + \frac{N_a}{N_a + N_s} \omega_2, \tag{18}$$

Figure 3F:
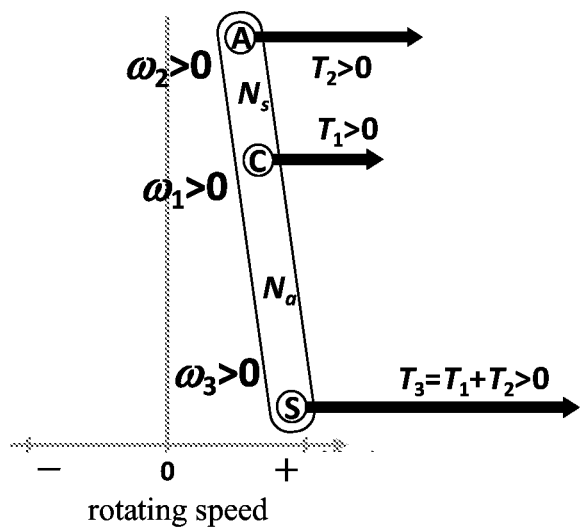
FIG. 3f is a schematic view of torques and rotating speed states of another embodiment of the continuously variable transmission system with planet gear and dual-rotor motor for electric vehicle of the present invention under the overdrive condition.

When the inner rotor 3 and the outer rotor 1 of the motor are connected with the planet carrier 6 and the ring gear 4 of the planet gear 20, respectively, and it is output from the sun gear 7, the system can realize overdrive, i.e., the rotating speed of the sun gear 7 is higher than those of the inner rotor 3 and the outer rotor 1 of the motor, as shown in FIG. 3f. At this time, the output rotating speed $\omega_s$ is determined by the equation (19):

$$\omega_s = \frac{N_a + N_s}{N_s}\omega_c - \frac{N_a}{N_s}\omega_a = \omega_c + \frac{N_a}{N_s}(\omega_c - \omega_a). \tag{19}$$

It can be seen that, for $N_a > N_s$, as long as $\omega_c > \omega_a$, then $\omega_s > \omega_c > \omega_a$, i.e., the overspeed state.

Figure 3G:
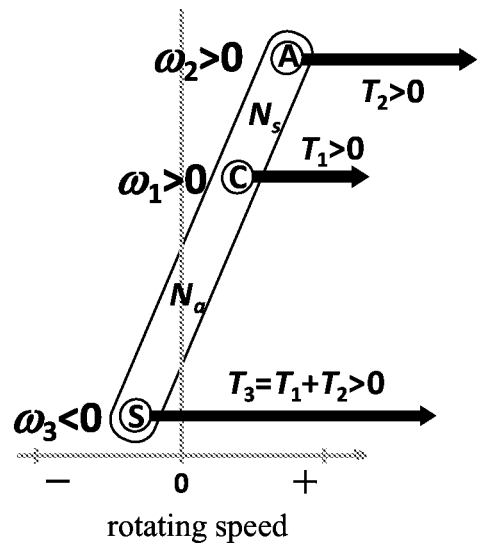
FIG. 3g is a schematic view of torques and rotating speed states of another embodiment of the continuously variable transmission system with planet gear and dual-rotor motor for electric vehicle of the present invention under the forward reversing transmission condition.

When the inner rotor 3 and the outer rotor 1 of the motor are connected with the planet carrier 6 and the ring gear 4 of the planet gear 20, respectively, and it is output from the sun gear 7, the system further can achieve the forward reversing transmission, i.e., the inner rotor 3 and the outer rotor 1 of the motor rotate in the forward direction, while the rotating speed output from the sun gear 7 is in the backward direction, as shown in FIG. 3g. According to the equation (19), as long as $$\omega_c < \frac{N_a}{N_a + N_s}\omega_a$$

is meet, the output rotating speed $\omega_s$ is less than zero, i.e., the reversing state.

The continuously variable transmission system with planet gear and dual-rotor motor for electric vehicle according to the present invention is controlled by an optimal energy economical control method, a motor running mode as a driving mode, or a braking energy feedback mode as determined with the vehicle controller according to a running state of the vehicle, a battery state of charge (SOC), states and time rates of changes of the accelerator pedal and the brake pedal, and then a working torque $T_3$ of the dual-rotor motor for the electric vehicle is determined; then the motor running mode and the torque instruction are sent to a controller for the inner motor subsystem and a controller for the outer motor subsystem, then with the controller for the inner motor subsystem and the controller for the outer motor subsystem, torques $T_1$, $T_2$ that the inner rotor and the outer rotor should provide are determined according to the topological structure of the continuously variable transmission system with the planet gear and the dual-rotor motor for electric vehicles and the tooth numbers of the ring gear and the sun gear, an output rotating speed $\omega_3$ is calculated according to the vehicle speed and the dynamic radius of the wheels, then optimal working rotating speeds of the inner rotor and the outer rotor at this time are calculated in real time according to the efficiency curve of the system constituted by the inner motor subsystem and the outer motor subsystem and the shared motor controller.

Once the target torques and the working rotating speeds of the inner rotor and the outer rotor are determined, excitation current components $i_{d1}$, $i_{d2}$ and torque current components $i_{q1}$, $i_{q2}$ of the inner three-phase winding and the outer three-phase winding are determined according to the vector control algorithm, and then three-phase alternating currents $i_{A1}$, $i_{B1}$, $i_{C1}$ and $i_{A2}$, $i_{B2}$, $i_{C2}$ input into the inner three-phase winding and the outer three-phase winding are determined according to the following Clarke inverse transform equation (8) and the Park inverse transform equation (9), so as to make the inner rotor and the outer rotor run under the target torques and at the working rotating speeds.

The continuously variable transmission system with the planet gear and the dual-rotor motor for electric vehicles according to the present invention has a technical solution different from that of the traditional fuel vehicles, its main features are that: (1) It can sufficiently make use of the wide speed adjustable range of the motor to regulate speeds; (2) Compared with an automatic stepped or continuous variable transmission cooperating with a traditional internal combustion engine, the structure of the transmission system is simpler, (3) It has advantages of stepless speed change and high transmission efficiency. The present invention utilizes a dual-rotor, single-stator alternating current motor and a planet gear mechanism, to achieve the above characteristics more desirably.

Although the dual-rotor motor has been proposed previously, such as in the Chinese invention patent application 200810157523.1 "dual-rotor planet differential generator" and the Chinese utility model patent 200820171987.3 "planet built-in dual-rotor wind driven generator". However, the continuously variable transmission system with planet gear and dual-rotor motor for electric vehicle provided by the present invention is different from these two inventions-creations in basic structures and application situations. Firstly, there is a stator 2 between the dual rotors in the present invention, while each of the dual-rotor motors of the two inventions-creations mentioned above is only constituted by two rotors, and does not have any stator, its inner rotor is equal to the stator of a general motor; secondly, the present invention is mainly used in electric vehicles, while the two inventions-creations mentioned above are used in wind driven generators.

To sum up, the dual-rotor motor for electric vehicle of the present invention is designed skillfully and is unique in structure. By cooperating with the planet gear, the dual-rotor motor can sufficiently make use of the wide speed adjustable range of the motor to regulate speeds. Compared to an automatic stepped or continuous variable transmission cooperating with a traditional internal combustion engine, the structure of the transmission system is simpler, and has advantages of stepless speed change and high transmission efficiency, and ultimately improves the vehicle performance, therefore the present invention is suitable for large-scale popularization.

In the present specification, the present invention has been described according to the particular embodiments. But it is obvious that these embodiments can be modified or changed without departure from the spirit and scope of the present invention. Therefore, the specification and drawings described above are exemplary only and not intended to be limiting.

I claim:

1. A drive system for an electric vehicle, comprising:
a dual rotor motor in mechanical communication with a continuously variable transmission system, and a vehicle controller, the dual rotor motor comprising:
a housing; an output shaft; an outer rotor; a stator located inside the housing, the output shaft being at least partly located in the housing and arranged rotatably relative to the housing, the stator being sleeved around the output shaft, an outer three-phase winding being arranged outside the stator, the outer rotor being sleeved around the outer three-phase winding and arranged rotatably relative to the stator, an inner rotor, an inner three-phase winding arranged inside the stator, the inner rotor is inserted in the inner three-phase winding around the output shaft and arranged rotatably relative to the stator, thus the inner three-phase winding and the inner rotor constitute an inner motor subsystem, the outer three-phase winding and the outer rotor constitute an outer motor subsystem; and
wherein the continuously variable transmission comprises:
a planet gear; a set of ring gears; a planet carrier; a sun gear;
wherein the outer rotor of the dual rotor motor is connected with at least one of a first ring gear of the set of ring gears, the planet carrier, and the sun gear of the planet gear, the inner rotor is connected with at least one of a second ring gear of the set of ring gears, the planet carrier and the sun gear, and the output shaft of the dual rotor motor is connected with a third ring gear of the set of ring gears, the planet carrier and the sun gear; and
wherein the vehicle controller optimizes the energy and economical control of the drive system through the following: a determination of a vehicle running state of a motor running mode to be a driving mode or a braking energy feedback mode a battery state of charge (SOC), states and time rates of change of an accelerator pedal and a brake pedal, and a determination of a set of separate working torques of the dual rotor motor ($T_3$), inner motor subsystem ($T_1$), and outer motor subsystem ($T_2$) that are based on a topological structure of the drive system and tooth numbers of the ring gear and the sun gear, a determination of an output rotating speed ($\omega_3$) according to the speed of the electric vehicle and the dynamic radius of a wheel of the electric vehicle, where the separate working torques are used in real time to calculate a set of optimal working rotating speeds of the inner rotor and the outer rotor at this time according to an efficiency curve of the inner motor subsystem and the outer motor subsystem, wherein:

$$\max[\eta_{sys}] = \max[\eta_{sys1}(T_1, \omega_1) \cdot \eta_{sys2}(T_2, \omega_2)] \quad (2),$$

$$T_1 = f(T_3, N_a, N_s) \quad (3),$$

$$T_2=f(T_3,N_a,N_s) \quad (4),$$

$$\omega_3=f(\omega_1,\omega_2,N_a,N_s) \quad (5),$$

and wherein, $\eta_{sys}$ is a total system efficiency, $\eta_{sys1}$ is a comprehensive system efficiency of the controller for the inner motor subsystem, the inner three-phase winding and the inner rotor; $\eta_{sys2}$ is a comprehensive system efficiency of the controller for the outer motor subsystem, the outer three-phase winding and the outer rotor; $T_1$ is the target torque that the inner rotor should provide; $T_2$ is the target torque that the outer rotor should provide; $\omega_1$ is the optimal working rotating speed of the inner rotor at this time; $\omega_2$ is the optimal working rotating speed of the outer rotor at this time.

2. The drive system according to claim 1, characterized in that, each of the outer rotor and the inner rotor is any one of a permanent magnet and an excitation winding.

3. The drive system according to claim 1, characterized in that, the outer rotor is connected with the ring gear, the inner rotor is connected with the sun gear, and the output shaft is connected with the planet carrier.

4. The drive system according to claim 1, characterized in that, the outer rotor is connected with the ring gear, the inner rotor is connected with the planet carrier, and the output shaft is connected with the sun gear.

5. The drive system according to claim 1, characterized in that, the outer rotor is connected with the planet carrier, the inner rotor is connected with the ring gear, and the output shaft is connected with the sun gear.

6. The drive system according to claim 1 further comprising a differential, and the output shaft is connected with the differential.

7. The drive system according to claim 6, further comprising a pair of main reduction gears, where the pair of main reduction gears are located between the planet gear and the differential housing and wherein the pair of main reduction gears are connected with the planet gear and the differential housing respectively.

8. The drive system according to claim 6, further comprising a semiaxle, the semiaxle is connected with the differential, and the output shaft is a hollow shaft through which the semiaxle passes.

9. An optimal energy economical control method for a drive system for an electric vehicle comprising: determining a motor running mode to be a driving mode, or a braking energy feedback mode with a vehicle controller according to a running state of the vehicle, a battery state of charge (SOC), states and time rates of changes of an accelerator pedal and a brake pedal, and then determining a working torque $T_3$ of a dual-rotor motor for the electric vehicle; then sending the motor running mode and a torque instruction to a controller for an inner motor subsystem and a controller for an outer motor subsystem, then with the controller for the inner motor subsystem and the controller for the outer motor subsystem, determining torques $T_1$, $T_2$ that an inner rotor and an outer rotor should provide according to a topological structure of the drive system and tooth numbers of a ring gear and a sun gear, calculating an output rotating speed $\omega_3$ according to speed of the electric vehicle and dynamic radius of a wheel of the electric vehicle, then in real time calculating optimal working rotating speeds of the inner rotor and the outer rotor at this time according to an efficiency curve of the inner motor subsystem and the outer motor subsystem, wherein:

$$\max[\eta_{sys}]=\max[\eta_{sys1}(T_1,\omega_1)\cdot\eta_{sys2}(T_2,\omega_2)], \quad (2)$$

$$T_1=f(T_3,N_a,N_s), \quad (3)$$

$$T_2=f(T_3,N_a,N_s), \quad (4)$$

$$\omega_3=f(\omega_1,\omega_2,N_a,N_s), \quad (5)$$

wherein, $\eta_{sys}$ is a total system efficiency, $\eta_{sys1}$ is a comprehensive system efficiency of the controller for the inner motor subsystem, the inner three-phase winding and the inner rotor; $\eta_{sys2}$ is a comprehensive system efficiency of the controller for the outer motor subsystem, the outer three-phase winding and the outer rotor; $T_1$ is target torque that the inner rotor should provide; $T_2$ is target torque that the outer rotor should provide; $\omega_1$ is optimal working rotating speed of the inner rotor at this time; $\omega_2$ is optimal working rotating speed of the outer rotor at this time; and wherein the drive system comprises:

a dual rotor motor in mechanical communication with a continuously variable transmission system, and a vehicle controller, the dual rotor motor comprising:

a housing; an output shaft; an outer rotor; and a stator located inside the housing, the output shaft being at least partly located in the housing and arranged rotatably relative to the housing, the stator being sleeved around the output shaft, an outer three-phase winding being arranged outside the stator, the outer rotor being sleeved around the outer three-phase winding and arranged rotatably relative to the stator, characterized in that, the dual-rotor motor for electric vehicle further comprises an inner rotor, an inner three-phase winding is arranged inside the stator, the inner rotor is inserted in the inner three-phase winding around the output shaft and arranged rotatably relative to the stator, thus the inner three-phase winding and the inner rotor constitute an inner motor subsystem, the outer three-phase winding and the outer rotor constitute an outer motor subsystem; and wherein the continuously variable transmission comprises:

a planet gear; a set of ring gears; a planet carrier; a sun gear; and wherein the outer rotor of the dual rotor motor is connected with at least one of a first ring gear of the set of ring gears, the planet carrier, and the sun gear of the planet gear, the inner rotor is connected with at least one of a second ring gear of the set of ring gears, the planet carrier and the sun gear, and the output shaft of the dual rotor motor is connected with a third ring gear of the set of ring gears, the planet carrier and the sun gear.

10. An optimal energy economical control method for a drive system for an electric vehicle comprising: determining a motor running mode to be a driving mode, or a braking energy feedback mode with a vehicle controller according to a running state of the vehicle, a battery state of charge (SOC), states and time rates of changes of an accelerator pedal and a brake pedal, and then determining a working torque $T_3$ of a dual-rotor motor for electric vehicle; then sending the motor running mode and a torque instruction to a motor controller, then with the motor controller, determining torques $T_1$, $T_2$ that an inner rotor and an outer rotor should provide according to a topological structure of the drive system and tooth numbers of a ring gear and a sun gear, calculating an output rotating speed $\omega_3$ according to vehicle speed and dynamic radius of a wheel of the electric vehicle wheel, then in real time calculating optimal working rotating speeds of the inner rotor and the outer rotor at this time according to an efficiency curve of the inner motor subsystem and the outer motor subsystem, wherein:

$$\max[\eta_{sys}] = \max\left[\frac{\eta_{m1}(T_1, \omega_1)T_1\omega_1 + \eta_{m2}(T_2, \omega_2)T_2\omega_2}{T_1\omega_1 + T_2\omega_2}\eta_c(T_1, \omega_1, T_2, \omega_2)\right], \quad (7)$$

$$T_1 = f(T_3, N_a, N_s), \quad (3)$$

$$T_2 = f(T_3, N_a, N_s), \quad (4)$$

$$\omega_3 = f(\omega_1, \omega_2, N_a, N_s), \quad (5)$$

wherein, $\eta_{sys}$ is a total system efficiency, $\eta_{m1}(T_1,\omega_1)$ is a system efficiency of the inner motor subsystem; $\eta_{m2}(T_2, \omega_2)$ is a system efficiency of the outer motor subsystem; $\eta_c(T_1,\omega_1,T_2,\omega_2)$ is an efficiency of the motor controller; $T_1$ is target torque that the inner rotor should provide; $T_2$ is target torque that the outer rotor should provide; $\omega_1$ is optimal working rotating speed of the inner rotor at this time; $\omega_2$ is optimal working rotating speed of the outer rotor at this time; and wherein the drive system comprises:
a dual rotor motor in mechanical communication with a continuously variable transmission system, and a vehicle controller, the dual rotor motor comprising:
a housing; an output shaft; an outer rotor; and a stator located inside the housing, the output shaft being at least partly located in the housing and arranged rotatably relative to the housing, the stator being sleeved around the output shaft, an outer three-phase winding being arranged outside the stator, the outer rotor being sleeved around the outer three-phase winding and arranged rotatably relative to the stator, characterized in that, the dual-rotor motor for electric vehicle further comprises an inner rotor, an inner three-phase winding is arranged inside the stator, the inner rotor is inserted in the inner three-phase winding around the output shaft and arranged rotatably relative to the stator, thus the inner three-phase winding and the inner rotor constitute an inner motor subsystem, the outer three-phase winding and the outer rotor constitute an outer motor subsystem; and wherein the continuously variable transmission comprises:
a planet gear; a set of ring gears; a planet carrier; a sun gear; and
wherein the outer rotor of the dual rotor motor is connected with at least one of a first ring gear of the set of ring gears, the planet carrier, and the sun gear of the planet gear, the inner rotor is connected with at least one of a second ring gear of the set of ring gears, the planet carrier and the sun gear, and the output shaft of the dual rotor motor is connected with a third ring gear of the set of ring gears, the planet carrier and the sun gear.

11. The optimal energy economical control method for a drive system for an electric vehicle according to claim 9, characterized in that, it uses a current and rotating speed dual closed-loop control method, and determines excitation current components $i_{d1}$, $i_{d2}$ and torque current components $i_{q1}$, $i_{q2}$ of the inner three-phase winding and the outer three-phase winding according to a vector control algorithm, once the target torques and the optimal working rotating speeds of the inner rotor and the outer rotor are determined, and then determines three-phase alternating currents $i_{A1}$, $i_{B1}$, $i_{C1}$ and $i_{A2}$, $i_{B2}$, $i_{C2}$ input into the inner three-phase winding and the outer three-phase winding according to the following Clarke inverse transform equation (8) and the Park inverse transform equation (9), so as to make the inner rotor and the outer rotor run under the target torques and at the optimal working rotating speeds, wherein:

$$\begin{bmatrix} i_{A1} \\ i_{B1} \\ i_{C1} \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta_1 & -\sin\theta_1 \\ \sin\theta_1 & \cos\theta_1 \end{bmatrix} \begin{bmatrix} i_{d1} \\ i_{q1} \end{bmatrix}, \quad (8)$$

$$\begin{bmatrix} i_{A2} \\ i_{B2} \\ i_{C2} \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta_2 & -\sin\theta_2 \\ \sin\theta_2 & \cos\theta_2 \end{bmatrix} \begin{bmatrix} i_{d2} \\ i_{q2} \end{bmatrix}, \quad (9)$$

Wherein $\theta_1$, $\theta_2$ are angles between $\alpha$ axis in a two-phase stationary coordinate system $\alpha$-$\beta$, and d axis in a two-phase rotating coordinate system d-q, respectively.

12. The optimal energy economical control method for a drive system for an electric vehicle according to claim 10, characterized in that, it uses a current and rotating speed dual closed-loop control method, and determines excitation current components $i_{d1}$, $i_{d2}$ and torque current components $i_{q1}$, $i_{q2}$ of the inner three-phase winding and the outer three-phase winding according to a vector control algorithm, once the target torques and the optimal working rotating speeds of the inner rotor and the outer rotor are determined, and then determines three-phase alternating currents $i_{A1}$, $i_{B1}$, $i_{C1}$ and $i_{A2}$, $i_{B2}$, $i_{C2}$ input into the inner three-phase winding and the outer three-phase winding according to the following Clarke inverse transform equation (8) and the Park inverse transform equation (9), so as to make the inner rotor and the outer rotor run under the target torques and at the optimal working rotating speeds, wherein:

$$\begin{bmatrix} i_{A1} \\ i_{B1} \\ i_{C1} \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta_1 & -\sin\theta_1 \\ \sin\theta_1 & \cos\theta_1 \end{bmatrix} \begin{bmatrix} i_{d1} \\ i_{q1} \end{bmatrix}, \quad (8)$$

$$\begin{bmatrix} i_{A2} \\ i_{B2} \\ i_{C2} \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta_2 & -\sin\theta_2 \\ \sin\theta_2 & \cos\theta_2 \end{bmatrix} \begin{bmatrix} i_{d2} \\ i_{q2} \end{bmatrix}, \quad (9)$$

wherein $\theta_1$, $\theta_2$ are angles between an $\alpha$ axis in a two-phase stationary coordinate system $\alpha$-$\beta$, and a d axis in a two-phase rotating coordinate system d-q, respectively.

* * * * *